April 19, 1966 K. E. SIHVONEN 3,247,519

GRAPHICAL RECORDING SYSTEM EMPLOYING HEATED INK COMPOSITIONS

Filed Aug. 20, 1962 2 Sheets-Sheet 1

KAUNO E. SIHVONEN
INVENTOR.

BY Fraser and Bogucki
ATTORNEYS

April 19, 1966   K. E. SIHVONEN   3,247,519
GRAPHICAL RECORDING SYSTEM EMPLOYING HEATED INK COMPOSITIONS
Filed Aug. 20, 1962   2 Sheets-Sheet 2
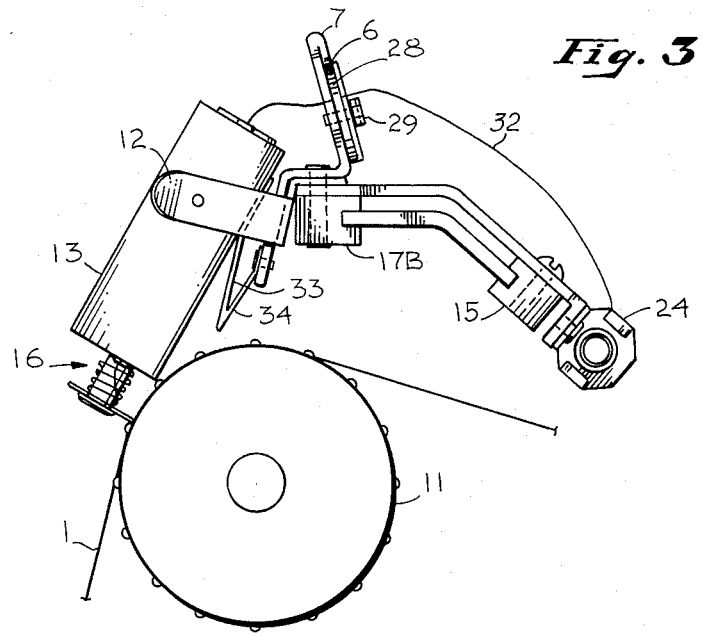
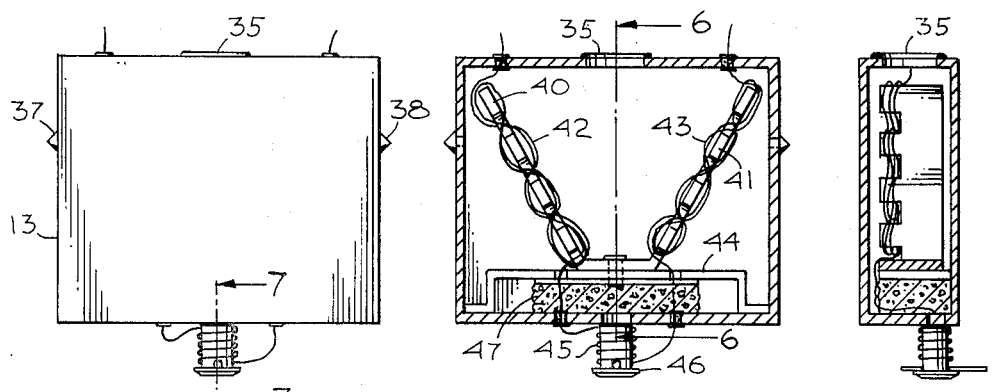
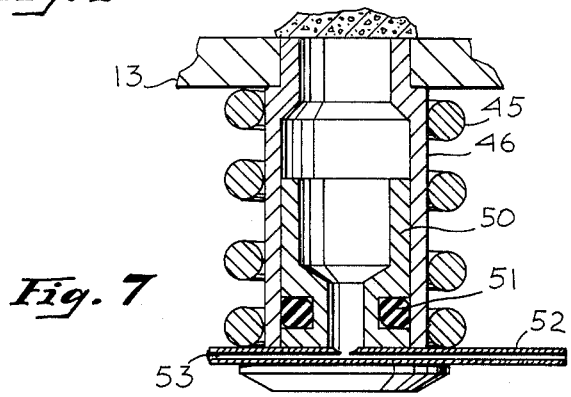
KAUNO E. SIHVONEN
INVENTOR.
BY
ATTORNEYS United States Patent Office 3,247,519
Patented Apr. 19, 1966

3,247,519
GRAPHICAL RECORDING SYSTEM EMPLOYING HEATED INK COMPOSITIONS
Kauno E. Sihvonen, Arcadia, Calif., assignor to Neff Instrument Corporation, a corporation of Delaware
Filed Aug. 20, 1962, Ser. No. 217,891
10 Claims. (Cl. 346—140)

This invention relates to improvements in graphical recording systems and more particularly relates to improvements in a graphical recording system employing heated ink compositions, a method of operating the system, heated ink compositions for use in the system and methods of preparing the inks.

It is well-known to provide a visual record of a relationship between at least one variable and time or between two variables by graphically producing a trace upon the surface of a recording medium, such as a moving sheet of chart paper, in accordance with changes in the variable or variables to be recorded. The production of such visible traces can be accomplished by means of conventional graphical recorders which include servo mechanisms responsive to electrical signals for positioning a marking pen with respect to the surface of a record sheet.

However, in known recording arrangements the marking means, including the marking pen and the ink used in the pen, produce somewhat unsatisfactory results. In this regard, conventional inks employed in graphical recording systems usually contain high concentrations of water. Aqueous inks tend to soften the surface of the conventional fibrous recording media in which they are in contact. The softening is usually more pronounced when the recorder pen is substantially at rest on the surface of the recording medium. This is also the case when the recorder pen traces lines which are closely spaced. When the fibers of the surface of the recording medium soften during contact with the aqueous ink, they become more moisture absorbent and more easily subject to mechanical damage. Blobbing of the ink, by reason of withdrawal of excess quantities of ink from the recording pen into the wetted surface areas may occur, resulting in blurring and running together of the trace lines. Moreover, the continuity of the softened surface of the recording medium may be disrupted, particularly if the recorder pen is in direct frictional contact therewith.

Moreover, aqueous inks used in graphical recording systems dry rather slowly. Accordingly, care must be exercised in handling the record sheet after the trace is applied to it in order to avoid smearing or destruction of the trace.

It has also been found that when ballpoint pens are employed in graphical recording systems, the pens have a tendency to skip, that is to fail at certain speeds of travel to apply a continuous trace to the surface of the recording medium. None of the known arrangements of graphical recording systems are completely satisfactory under conditions of both high and low recording speeds for the production of continuous rapid drying traces on graphical recording media.

Accordingly, it is an object of the present invention to provide improvements in a graphical recording system.

It is also an object of the present invention to provide a graphical recording system capable of operating efficiently at both high and low speeds.

It is a further object of the present invention to provide means whereby a clear unblurred continuous trace can be formed on a graphical recording medium without adversely affecting the medium.

It is another object of the present invention to provide rapidly drying graphical recording ink which does not soften fibrous recording media.

It is also an object of the present invention to provide a method of preparing such ink.

It is yet another object of the present invention to provide a new and improved method of graphical recording, which method results in the production of a clear unblurred continuous trace on a recording medium without disrupting the surface of the medium.

In accordance with one aspect of the present invention, a graphical recording system is provided utilizing an improved ink having a relatively sharply defined melting point. Means are provided for maintaining the ink in a heated fluid condition within the graphical recording system and depositing the ink in the fluid state as a continuous smooth trace upon the surface of a record medium to represent a variable to be recorded. The temperature of the ink is controlled with respect to that of the surface of the recording medium by suitable means so that the ink when transferred to the medium as a trace solidifies rapidly to form a permanent record. Application of the ink to the recording medium and solidifying of the ink thereon are efficiently accomplished without any deterioration of the surface of the recording medium.

In accordance with another aspect of the present invention, a method of graphically recording is provided in which the ink is first heated to above the melting point thereof in a heating zone and is fluidized and is then passed into a confining zone which restricts the cross section of the ink while the ink is maintained as a fluid. The ink is then passed from the confining zone into contact with a graphical recording medium at a temperature at which the ink solidifies substantially immediately, whereby a desired permanent trace is provided on the medium. The trace is in a configuration corresponding to a variable to be recorded.

In accordance with still another aspect of the present invention, ink compositions are provided which have characteristics which particularly adapt the inks for use in recording information in the form of traces upon a recording medium.

In accordance with a further aspect of the present invention, methods are provided for preparing the ink composition.

As an example, in one particular graphical recording system in accordance with the present invention, a graphical recorder is provided with a heated reservoir connected to a tubular heated pen. An opening is provided to allow passage of ink from the reservoir to the pen. The pen is positioned adjacent a recording medium and is moved over the surface thereof by means of a carriage responsive to changes in the variable to be graphically recorded. Non-aqueous ink, normally solid at ambient or room temperature, is disposed in the reservoir and is fluidized therein at elevated temperature. The ink may, for example, comprise a mixture of chlorinated naphthalene waxes having selected properties, in which is dissolved selected organic dye. The material within the reservoir is maintained in its fluid state and is passed in a heated condition through the pen for deposition as a trace on a recording medium. The diameter of the pen opening is selected with respect to the surface tension of the fluidized ink so that the ink does not readily flow therefrom until the surface tension is broken by contacting the ink at the writing end of the pen with the surface of the recording medium. Therefore, dripping of ink from the pen is avoided. However, during recording the ink smoothly flows from the pen and provides a cushion or film between the adjacent surfaces of the pen and the recording medium. Accordingly, the pen does not drag or skip on such surface but moves smoothly thereover, providing a continuous trace. Substantially immediately after deposition of the fluid ink as a trace upon the surface of the record medium, solidification of the ink takes place, so that a dry permanent trace is provided upon the surface of the record medium. No wetting, softening, soaking, surface disrupting or other deterioration of the surface of the recording sheet occurs during or as a result of the recording.

The reservoir and the pen may be maintained at a suitable operating temperature by means of resistance heating elements or the like. Such elements can be immersed in the reservoir and thermally coupled to the pen. A preferred heating arrangement provides for rapidly fluidizing ink which may have solidified in the pen subsequent to a preceding recording operation to a fluid state, so that the recording operation can take place practically immediately upon energization of the recorder and before ink in the reservoir is completely fluidized.

A better understanding of the invention may be had from a reading of the following detailed description and an inspection of the drawings in which:

FIG. 3 is a right end view of the structure of FIG. 2;

FIG. 4 is a front view of the heated ink reservoir and pen unit in a graphical recording system;

FIG. 5 is a front view of the ink reservoir and pen unit of FIG. 4 with the front cover broken away;

FIG. 6 is a sectional view of the ink reservoir and pen unit of FIG. 4 taken from a viewpoint along line 6—6 of FIG. 5; and FIG. 7 is an enlarged cross sectional view of the pen portion of the structure of FIG. 4.

Figure 1:
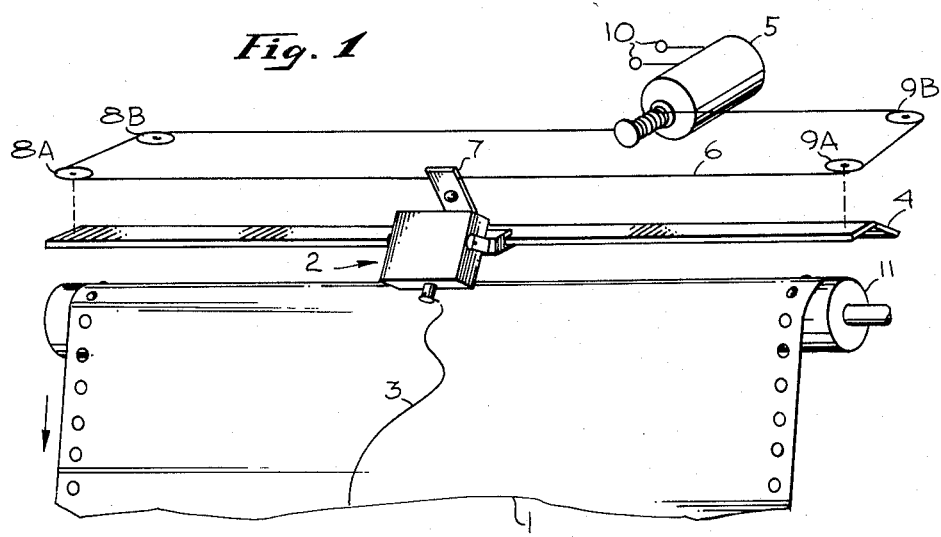
FIG. 1 is a diagrammatic illustration of a graphical recorder having a heated inking system in accordance with the invention.

FIG. 1 of the drawings illustrates a graphical recording system in simplified form incorporating a new and improved inking arrangement in accordance with the present invention. In the graphical recorder of FIG. 1, a recording medium in the form of a strip of chart paper 1 is transported relative to a pen carrier 2 which carries an inking system more fully described below for recording a variable in the form of a visible trace 3 on the chart paper 1. The pen carrier 2 is suspended from a support guide rail 4 extending generally transversely of the direction of movement of the chart paper 1 and is linked to a servo motor 5 via a drive cable 6 fastened to an upstanding member 7 on the pen carrier 2 and strung around pairs of idler pulleys 8A, 8B and 9A, 9B positioned adjacent the ends of the rail 4.

During operation of the recording system, signals corresponding to a variable to be recorded are applied to the terminals 10 to energize the servo motor 5 whereby the pen carrier 2 is continuously repositioned transversely of the chart paper 1. A toothed roller 11 engages apertures adjacent the edges of the chart paper 1 and provides a bed for recording beneath the pen carrier 2. Thus, as the chart paper 1 is transported there may be drawn in ink thereon a curve or trace 3 corresponding to the variations in the signal applied to the terminals 10.

It will be appreciated that the diagrammatic illustration of FIG. 1 has been simplified in order to more clearly set forth the graphical recording system and that in a given recording system conventional servo systems including null balancing circuits, electrical signal amplifiers and the like (not shown) may be included for suitably energizing the servo motor 5 to cause the pen carrier 2 to seek an appropriate position with reference to the chart paper 1 corresponding to the value of the variable being recorded. Moreover, the various elements illustrated are supported by conventional framing members and a transport system is linked to the chart 1 for effecting a suitable movement of the chart paper with reference to the pen carrier 2. Since servo systems, framing members and chart paper transport arrangements are well-known and appear in conventional graphical recorders, they are not illustrated in the accompanying drawings and detailed description thereof is not given herein.

In accordance with the method and apparatus of the present invention, the pen carrier 2 includes a special heated inking system wherein an ink having a wax base and which is ordinarily solid at ambient room temperature is heated into a fluid state for deposition upon the chart paper 1. Upon contacting the chart paper 1 in the form of the trace 3, the ink resumes its solid form, thereby providing a dry permanent visible trace.

Figure 2:
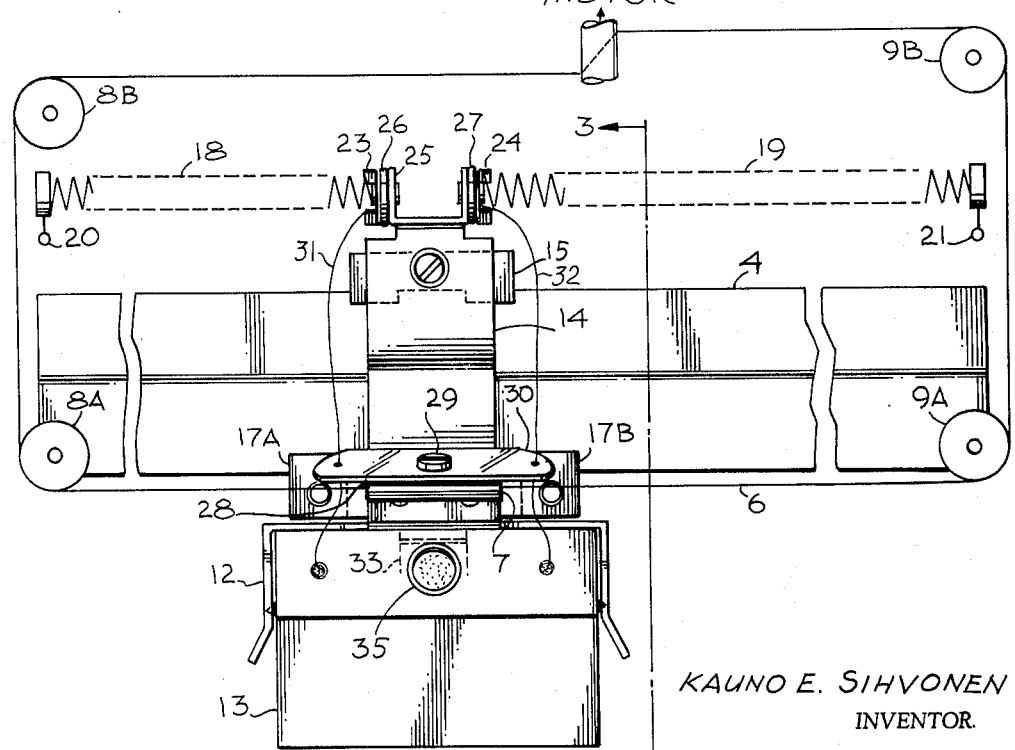
FIG. 2 is a plan view of the pen supporting structure of a recorder including a heated inking system.

FIGS. 2 and 3 illustrate one suitable arrangement for a graphical recorder inking system in accordance with the invention. In FIGS. 2 and 3 the pen carrier 2 includes a yoke 12 which pivotally supports an inking system comprising an integral unit including an ink reservoir 13 to which is attached a pen 16 positioned adjacent the chart paper 1 of FIG. 1. The reservoir 13 is pivotally suspended from the yoke 12 which is attached to a bracket 14 of the pen carrier 2 which is in turn slidably mounted upon the guide rail 4 by means of bearing surfaces in the form of bearings 15, 17A and 17B which may be constructed of Teflon or the like. Electrical connections to heating elements for maintaining the ink within the reservoir 13 in a fluid state in accordance with the invention may be made via spring conductors 18 and 19 connected between terminals 20 and 21 at opposite ends of the guide rail and electrical connectors 23 and 24 supported on a U-shaped extension 25 fastened to the bracket 14. The electrical connectors 23 and 24 are insulated from each other and from the U-shaped extension 25 by means of insulator ring mountings 26 and 27. The drive cable 6 is linked to the shaft of a servo motor in the manner shown diagrammatically in FIG. 1 and is fastened to the upstanding extension 7 from the bracket 14 by means of a clamp 28 held in place by a screw 29. The screw 29 also fastens in place an insulated wire support 30 through apertures in which electrical connection leads 31 and 32 are passed between the connectors 23 and 24 and the ink reservoir 13. A leaf spring 33 (FIG. 3) suspended downwardly from an extension 34 on the bracket 14 functions to provide a suitable pressure above the pivot point of the reservoir 13 so as to insure a suitable positioning of the pen 16 adjacent the surface of the chart 1.

Accordingly, as shown in FIGS. 2 and 3 a graphical recorder including an inking system in accordance with the present invention may include an arrangement for transporting an ink reservoir and integral pen unit with reference to a suitable recording medium such as a chart with electrical connections being made to the unit for the purposes of the invention in maintaining the ink at a suitable fluid temperature.

FIG. 4 is a front view of an integral reservoir and pen arrangement for use in accordance with the present invention as shown and described above. The reservoir 13 of FIG. 4 includes a top opening defined by a ring 35 through which sticks of solid ink material may be introduced into the reservoir 13 and raised in temperature to a fluid condition. By means of the trunnions 37 and 38 shown in FIG. 4, the reservoir may be suspended from the yoke 12 of the pen carrier 2 as shown in FIGS. 1–3. Referring to FIGS. 5 and 6, there is included within the reservoir 13 a pair of comb-shaped heater windings support members 40 and 41. As shown, heater windings 42 and 43 may be supported by the elements 40 and 41 for raising the temperature of an ink material within the reservoir 13 to a fluid state. The heater winding support elements 40 and 41 are supported on a bracket 44 which may be of heat conductive material so as to disperse the heat energy provided by the passage of current through the windings 42 and 43 in a uniform fashion. The windings 42 and 43 are connected serially with a winding 45 which is thermally coupled to an output conduit 46 at the bottom of the ink reservoir 13. The pen 16 is thereby maintained at a temperature above the melting point of the ink material so that a flow of the heated ink may be established and maintained for marking upon the surface of the chart 1 of FIG. 1.

In order to avoid clogging of the pen 16 there may be included in the reservoir 13 adjacent its outlet a filter element 47 of polyurethane foam. The filter element 47 functions to strain the fluid ink to remove any small particles of dye pigment, lint or dirt therefrom. The electrical connection leads 31 and 32 pass through the top of the ink reservoir 13 and terminate at the connectors 23 and 24 (FIG. 2) to receive current from a suitable source of electrical potential via the springs 18 and 19 and terminals 20 and 21. The openings at the top and bottom of the reservoir 13 for passing the electrical connection leads may be sealed with epoxy resin. In practice, it has been found that the heating element may be constructed of Nichrome wire having an approximate diameter of .0063 inch, approximately eight inches of wire being employed, the wire having a total resistance of 17 ohms. With the above specified heating elements, a suitable source of potential is eight volts with a current drain of 540 milli-amperes.

The construction of the pen 16 may be best seen in the enlarged cross sectional view of FIG. 7. The pen 16 comprises a hollow plug 50 which defines a reservoir of smaller volume than the ink reservoir 13 and which carries an O ring 51 to seal the plug within the output conduit 46 of the ink reservoir 13. The plug 50 supports a pen tip 52 comprising a small tube which passes through and extends transversely of the plug 50. Accordingly, pen tips of different sizes may be readily substituted, and a rapid replacement may be readily made as required. According to one aspect of this invention, the diameter of the opening in the pen tip is selected with respect to the surface tension of the ink so that fluid ink is inhibited from dripping or flowing from the pen tip until the surface tension is overcome by contacting the pen tip, that is, the ink held at the tip with the surface of the recording medium. The ink then readily flows onto the indicated surface and forms a film or cushion upon which the pen tip rides during graphical recording.

As shown in FIG. 7 a hollow conduit is provided between the reservoir 13 and a corresponding hole in the pen tip 52 via the interior (reservoir) of the hollow plug 50. The pen tip 52 may comprise a short length of a hypodermic needle and may, for example, have an outside diameter of .016 inch, an inside diameter of .006 inch and a length of 7/32 of an inch. The opening in the tube to admit ink from the hollow portion of the plug 50 may be formed by filing away a groove in the side of the pen tip 52. The end 53 of the pen tip 52 away from the chart may preferably be sealed, by an epoxy resin, for example, or in the alternative, the pen tip may be arranged to terminate within the reservoir of the hollow plug 50. The smaller volume of the pen reservoir with respect to the separate ink reservoir 13 allows the ink in the pen to be fluidized before the ink in the reservoir 13 is completely fluidized, whereby operation of the system can be initiated more rapidly after initiation of the ink heating.

The ink utilized in the described graphical recording system comprises a normally solid solution comprising a suitable dye in a selected wax. The ink is, of course, used in the liquid condition, as described. Additional constituents may be present, if desired, such as odor-imparting or odor-masking compounds, or the like, including for example, perfumes or extenders.

The wax of the ink comprises one or a plurality of selected waxes, normally solid at room temperature, that is at ambient temperature but liquid at the desired operating temperature for the graphical recording system, for example up to about 300° F. It is preferred that the wax remain a solid for temperatures up to at least about 120° F. so that the permanent ink trace applied to the recording medium will not melt away during normal usage and storage of the recording medium. It is even more preferred that the wax remain in solid form up to temperatures of about 150° F. or more. Moreover, the wax should have a rather sharply defined or narrow melting point range, preferably a substantially single melting point for more accurate control of solidification of the ink during use. Substantially identical melting and softening points for the wax are highly desirable so that softening of the wax does not occur substantially before fluidizing of the same.

It is also important that the wax have in the liquid condition a sufficiently low viscosity so that it flows readily and smoothly. This affects favorably its application to the recording medum as a trace. In this regard, it has been found that, for the purposes of the present invention, the wax should preferably have a viscosity in the liquid condition of not more than about 40 Saybolt seconds at a temperature substantially above its melting point, for example at about 50–100° F. above its melting point. However, the ink containing the wax should have sufficiently high surface tension so that the liquid ink will not freely flow out of the small diameter pen tip or conduit before the surface tension is broken.

Another desired feature of the wax is that upon evaporation thereof, as by long continued heating at or near the boiling point thereof, it should not leave a substantial residue behind, which would tend to clog the ink-containing components of the recording system. In order to assure safety in use, the wax of the ink should have a flash point substantially above the melting point and also a high fire point. The wax must also be capable of substantially completely dissolving and redissolving selected organic dyes.

Waxes which satisfy all of the above conditions and, accordingly, are preferred for use in the ink of the present invention comprise selected halogenated hydrocarbon synthetic waxes, particularly of the chlorinated naphthalene type. Certain of these synthetic waxes have viscosities in the liquid condition of not more than 35 Saybolt seconds. An example of a particularly preferred wax of this type is commercially sold under the registered U.S. trademark Halowax by Koppers Company, Inc., Pittsburgh, Pa., and is identified as product number 1001. Halowax 1001 comprises a mixture of trichloronaphthalenes and tetrachloronaphthalenes having an over-all chlorine saturation of about 50%, a melting point of about 190° F., an identical softening point, a flash point of about 285° F. and a boiling point in excess of 300° F. The Saybolt viscosity thereof is 30 at 266° F. Such a mixture of waxes completely dissolves certain organic dyes suitable for coloring the wax. The wax and the wax-containing ink made therefrom have no adverse effects on fibrous or selected plastic graphical recording media. In this regard, they do not wet, soften or otherwise deleteriously affect the surfaces of the recording media. Moreover, they flow smoothly, dry rather rapidly, do not run on the surface of the recording medium and are capable of efficiently forming traces during use of the improved graphical recording system at high speeds or low speeds, and intermediate speeds.

A second suitable chlorinated hydrocarbon wax is commercially known as Halowax 1099. Halowax 1099 comprises a mixture of trichloronaphthalenes and tetrachloronaphthalenes having an approximate chlorine concentration of about 52% of saturation, a melting point of about 215° F., a flash point of about 285° F. and a boiling point in excess of 300° F. As with Halowax 1001, there is no fire point up to the boiling point of the wax mixture. The viscosity of Halowax 1099 is 31 Saybolt seconds at 266° F.

Chlorinated naphthalenes and mixtures thereof such as the Halowaxes can be prepared in a number of ways, including the chlorination of naphthalene in the presence of iron, iron chloride, iodine or other suitable catalyst.

In one particular procedure, napthalene is treated with chlorine and 0.5% ferric chloride catalyst, then neutralized with caustic soda. The degree of chlorination of the naphthalene depends on how long the procedure is carried out, the relative concentrations of constituents, the operating conditions and other factors.

It will be understood that ink suitable for use in the present graphical recording system can also be prepared utilizing other waxes in place of or in addition to the described synthetic halogenated hydrocarbon waxes. In this regard, paraffin waxes have been used. Moreover, certain of other petroleum-derived waxes such as the microcrystalline waxes can be used in mixtures with certain vegetable waxes. However, with waxes other than the described halogenated hydrocarbon waxes it is difficult to obtain all desired ink characteristics, including the described sharply defined melting points and substantially identical softening points.

The dye utilized in the ink of the present invention is in a minor concentration with respect to the wax, usually from about 0.1 to about 1.0% by weight of the ink, preferably about 0.4%, by weight. The dye must, of course, be substantially completely soluble and re-soluble in the wax when the latter is in liquid form. Moreover, the dye should be heat stable up to and including the contemplated operating temperature of the recording system, and preferably should not leave a substantial residue upon evaporation. Suitable wax-soluble organic dyes are commercially available, some of which are light resistant and heat stable up to 300° F. or more. Thus, para reds, toluidine reds, benzidine yellows and similar dyes can be utilized in the ink. Toluidine red can, for example, be prepared by diazotizing 2-nitro-p-toluidine and coupling the product with alkaline 2-naphthol. Toners such as Victoria blue, methyl violet, brilliant green and the like are also suitable and usually can be prepared by reacting the basic dyestuff with a suitable reagent such as phosphotungstic acid to provide the desired dye. For example, one particularly suitable wax-soluble dye is prepared from a basic dyestuff of the triphenyl methane type having the formula $C_{33}H_{32}N_3Cl$. The dyestuff is converted to a toner through the use of phosphotungstic acid reagent and is known as Victoria blue. A substantially similar product is known as Victoria pure blue, and is commercially available from Dye Specialties, Inc. Victoria blue is light resistant and withstands baking at 270° F. for 20 minutes without discoloration.

The dyestuff may also comprise other selected dyes of the modified anthroquinone type, modified phthalocyanine type and other types.

It should be understood that the particular organic dye selected will largely depend upon the color desired in the ink, the particular wax or wax mixture utilized in the ink, the heat stability desired for the dye and the solubility of the dye in the wax. For example, both Halowax 1001 and Halowax 1099 can be separately successfully utilized with Victoria blue in ink carrying concentrations of the dissolved dye between about 0.1 and 1.0%, by weight, with the preferred concentration of the dissolved dye being about 0.4%, by weight of the ink. In the specific formulations the wax constitutes the remainder of the ink. The indicated dye can also be successfully utilized at 0.4% by weight concentration dissolved in paraffin wax having a melting point of, for example, between about 122° and about 124° F., the wax also constituting the remainder of each formulation.

In accordance with the method of the present invention for the preparation of the improved wax-base ink, the dye and wax are blended together and the dye is uniformly distributed and dissolved in the wax. This can be accomplished by heating particulate wax and dye together in a heating zone to above the melting point of the wax and fluidizing the wax. The liquefied solution can then be filtered or strained as by passing it through a suitable bronze filter so as to remove small undissolved particles therefrom, for example particles of more than 100 microns diameter. Before or after the filtering operation, the solution can, if desired, be heated to above the operating temperature contemplated for the graphical recording system in order to drive off any volatiles that may be present in the ink. Thereafter, the ink can be immediately used in the graphical recording system or can be cooled to below the solidification point thereof, as by passing it into a mold and allowing it to gradually cool to solid form.

As a specific example of the method of preparing the ink of the present invention, a particulate mixture containing approximately 99.5% Halowax 1001, by weight of the mixture and approximately 0.5% Victoria blue, by weight of the mixture, is heated to above 250° F. and the dye is uniformly distributed and dissolved in the liquid wax. The resulting solution is then filtered through a bronze filter having a pore diameter of about 100 microns, after which the solution is heated to above 300° F. for 5 minutes, then poured into a mold and cooled to solid form. The solid molded ink piece is hard, easy to handle and store, and has a melting point of about 190° F., and a flash point of about 285° F. The dye remains uniformly distributed in the ink, and upon remelting of the ink piece, the dye is completely dissolved in the wax and uniformly distributed therein.

During use of the ink in a liquid condition as a trace on a recording medium in the graphical recording system of the present invention, the ink flows smoothly, solidifies rapidly without running and does not soften below 190° F. The surface tension characteristics of the liquid ink are such that the ink does not drip from a small diameter pen conduit. Moreover, the liquid ink, when applied to the recording medium, provides a film upon which the recording pen point smoothly rides. Since the ink has a high flash point and a fire point at the boiling point thereof, fire hazards during use of the ink are minimized.

When the ink is prepared from wax which has substantially identical softening and melting points well above room temperature, a plurality of the molded solidified sticks or pieces of the ink can be stored together and handled without agglomerating and without sticking to storage and handling equipment. The solid ink sticks can be added directly to the reservoir of the graphical recording system in desired amounts before heating of the system to operating temperature.

Accordingly, an improved graphical recording system is provided which permits the rapid recording of variables as a permanent clear trace on a recording media without adversely affecting the recording media. The system is capable of efficiently operating over a wide range of speeds utilizing a hot inking arrangement which employs a liquefied, normally solid wax-base ink incorporating an organic dye. Means are provided for maintaining the ink at a desired temperature up to the point of application of the ink as a trace on the surface of the recording medium. During recording, the pen of the recording system smoothly rides over the surface of the recording medium without skipping or blotting, regardless of the recording speed. The ink trace solidifies rapidly and allows the recording medium to be wound up substantially immediately after use without blurring of the trace or printing off of the trace on adjoining portions of the wound recording medium. Leaking of ink from the recording pen can also be readily avoided so that marring of the surface of the recording medium can be avoided when the system is not in use or is operating at slow speeds. Various other advantages of the present invention have been set forth in the foregoing.

The particular arrangements shown and described herein are intended to be by way of example only of the manner in which the invention may be practiced. Thus, for some purposes it may be desirable to employ a remote ink reservoir, rather than closely coupling the reservoir with the pen. In such an instance, a conduit of any desired length can be employed to connect the reservoir and pen. In order to prevent solidification of the ink in the conduit during operation of the recorder, heating means can be disposed in and around the conduit.

It will be appreciated that other modifications, variations, and alternative forms are within the scope of the present invention and that the invention should not be considered to be limited by the foregoing description, but should be taken to include all alternative arrangements, modifications or equivalents falling within the scope of the appended claims.

What is claimed is:

1. An improved graphical recording system for producing a trace representing at least one variable on a recording medium, said system comprising, in combination, a recording medium, a pen adapted to produce a trace on the surface of said recording medium, a pen carrier connected to said pen and adapted to maintain said pen in close proximity to but above said surface, means connected to said pen carrier and adapted to position said pen with respect to said surface in response to at least one variable, an ink reservoir coupled to said pen and containing normally solid non-aqueous ink having a melting point above ambient temperature for supplying ink to said pen, said pen comprising a generally tubular conduit having a reduced diameter with respect to said reservoir and aligned for gravity flow of said ink from said reservoir to said surface of said medium, heating means connected to said reservoir and adapted to supply heated ink to said pen in a fluidized condition, whereby said ink can be readily deposited as a fluid on said surface to form a permanent trace corresponding to movements of said pen carrier relative to said recording medium in response to said variable, said ink being normally solid, fluidizable and nonaqueous, at least the terminal portion of said conduit of said pen being of a diameter selected with respect to the surface tension characteristic of said ink such that flow of said ink from said pen is inhibited while said ink in said conduit is out of ink-delivering approximation to said surface of said recording medium, said pen carrier being adapted to adjustably position said terminal portion of said conduit in and out of trace producing ink-delivering approximation to said surface, whereby said ink is pulled from said terminal portion of said conduit by contact with said surface, and said terminal portion of said conduit rides on a cushion of said ink above said surface.

2. The graphical recording system in accordance with claim 1 wherein said recording medium includes a chart and means for transporting said chart and wherein said pen carrier is supported for movement generally transverse of the direction of movement of said chart during recording.

3. An improved graphical recording system for producing a trace representing at least one variable on a recording medium, said system comprising, in combination, a recording medium, a pen adapted to produce a trace on the surface of said recording medium, a pen carrier connected to said pen and adapted to maintain said pen in close proximity to but out of direct contact with said surface, means connected to said pen carrier and adapted to position said pen with respect to said surface in response to at least one variable, an ink reservoir coupled to said pen and containing normally solid non-aqueous ink having a melting point above ambient temperature for supplying ink to said pen, said pen comprising a generally tubular conduit having a reduced diameter with respect to said reservoir and aligned for gravity flow of said ink from said reservoir to said surface of said medium, said conduit being generally straight throughout the length thereof and including a terminal tip portion having an internal diameter selected with respect to the surface tension characteristic of said ink such that flow of said ink in said tip is inhibited while said ink in said tip is out of contact with said surface of said medium, the ink-delivering end of said tip being squared off and adapted to ride on a cushion of said ink above said surface, said pen carrier being adapted to adjustably position said end about perpendicular to said surface and into ink-delivering approximation to said surface, whereby said ink is pulled from said end by contact with said surface and whereby said ink cushion is formed and maintained between said end and said surface, first heating means connected to said reservoir for supplying heated ink to said pen in a fluidized condition, and second heating means for maintaining said ink in a fluidized condition at a temperature whereby said ink can be readily deposited as a fluid on said surface to form a permanent trace corresponding to movements of said pen carrier relative to said recording medium in response to said variable.

4. An improved graphical recording system for producing a trace representing at least one variable on a recording medium, said system comprising, in combination, a recording medium, a pen adapted to produce a trace on the surface of said recording medium, a pen carrier connected to said pen and adapted to maintain said pen in close proximity to but out of direct physical contact with said surface, means connected to said pen carrier and adapted to position said pen with respect to said surface in response to at least one variable, an ink reservoir coupled to said pen and containing normally solid non-aqueous ink having a melting point above ambient temperature for supplying ink to said pen, said pen comprising a generally tubular conduit having a reduced diameter with respect to said reservoir and aligned for gravity flow of said ink from said reservoir to said surface of said medium, said conduit being generally straight throughout the length thereof and including a terminal tip portion having an internal diameter selected with respect to the surface tension characteristic of said ink such that flow of said ink in said tip is inhibited while said ink in said tip is out of contact with said surface of said medium, the ink-delivering end of said tip being squared off and adapted to ride on a cushion of said ink above said surface, said pen carrier being adapted to adjustably position said end about perpendicular to said surface and into ink-delivering approximation to said surface, whereby said ink is pulled from said end by contact with said surface and whereby said ink cushion is formed and maintained between said end and said surface, first heating means connected to said reservoir for supplying heated ink to said pen in a fluidized condition, and second heating means coupled to said pen reservoir and interconnected with said first heating means for maintaining said ink in said pen in a fluidized condition at a temperature whereby said ink can be readily deposited as a fluid on said surface to form a permanent trace corresponding to movements of said pen carrier relative to said recording medium in response to said variable, said heating means comprising an electrical resistance element immersed in said ink in said reservoir, a portion of which extends from said reservoir into contact with said conduit of said pen.

5. An improved graphical recording system for producing a trace representing at least one variable on a recording medium, said system comprising, in combination, a recording medium, a pen adapted to produce a trace on the surface of said recording medium, a pen carrier connected to said pen and adapted to maintain said pen in close proximity to said surface, means connected to said pen carrier and adapted to position said pen with respect to said surface in response to at least one variable, a separate ink reservoir coupled to said pen and containing normally solid non-aqueous ink having a melting point above ambient temperature for supplying ink to said pen, said pen comprising a generally tubular conduit having a reduced diameter defining a reservoir of reduced volume with respect to said separate reservoir, said pen also including a terminal tip having an internal diameter sufficiently small in relation to the surface tension characteristic of said ink such that flow of said ink from said tip is inhibited while said ink is out of contact with said surface of said recording medium, said tip being essentially straight with a squared off end adapted to be disposed perpendicular to said surface, whereby said end is readily adapted to ride on a cushion of said ink above said surface, first heating means connected to said separate reservoir for supplying heated ink to said pen in a fluidized condition, and second heating means coupled to said pen and serially connected with said first heating means for maintaining said ink in said pen in a fluidized condition at a temperature whereby said ink can be readily deposited as a fluid on said surface to form a permanent trace corresponding to movements of said pen carrier relative to said recording medium in response to said variable, said heating means comprising an electrical resistance element immersed in said ink in said separate reservoir, a portion of which element extends from said separate reservoir into contact with said conduit of said pen, said heating means being adapted to supply sufficient heat energy for fluidization of said ink more rapidly to said reservoir of said pen than to said separate reservoir, whereby during initial energization of said heating means the said graphical recording system becomes operable as soon as ink solidified within said pen reservoir becomes fluidized by said heating means.

6. A graphical recording system in accordance with claim 5 wherein filtering means are disposed between said separate reservoir and said pen, whereby said conduit of said pen during operation of said recording system is maintained essentially free of ink flow-obstructing particles.

7. An improved graphical recording system for producing a trace representing at least one variable on a recording medium, said system comprising, in combination, a recording medium, a pen having a writing end adapted to produce a trace on the surface of said recording medium, a pen carrier connected to said pen and adapted to maintain said pen in close proximity to said surface, means connected to said pen carrier and adapted to position said pen with respect to said surface in response to at least one variable, an ink reservoir coupled to said pen and containing ink having an initial flow point above ambient temperature for supplying said ink to said pen, said pen comprising a generally tubular conduit having a reduced diameter with respect to said reservoir and positioned for flow of said ink from said reservoir to said surface of said medium, heating means connected to said reservoir and adapted to supply heated ink to said pen in a fluidized condition whereby said ink can be readily deposited as a fluid on said surface to form a permanent trace corresponding to movements of said pen carrier relative to said recording medium in response to said variable, at least the terminal portion of said conduit of said pen being of a diameter selected with respect to the surface tension characteristics of said ink such that flow of said ink from said pen is inhibited while said conduit is out of ink-delivering approximation to said surface of said recording medium, means for providing relative adjusting movement between said writing end of said pen and said recording medium to adjustably position said writing end in and out of trace-producing ink-delivering approximation to said surface of said recording medium, whereby said ink is pulled from said writing end by contact with said surface, and said writing end rides on a cushion of said ink above said surface.

8. The graphical recording system of claim 7 wherein a second heating means is coupled to said conduit and adapted to maintain said ink in said conduit in a fluidized condition.

9. The improved graphical recording system of claim 8 wherein said second heating means comprises a coil heater disposed adjacent the outer surface of the terminal portion of said conduit and wherein the terminal portion of said conduit is replaceable without disturbing the coil heater.

10. The improved graphical recording system of claim 9 wherein the coil heater is a low voltage type.

References Cited by the Examiner

UNITED STATES PATENTS

| | | | |
|---|---|---|---|
| 1,656,338 | 1/1928 | Ranger | 346—140 X |
| 2,100,204 | 11/1937 | Shore | 346—75 X |
| 2,628,881 | 2/1953 | Adams | 346—1 |
| 2,667,402 | 1/1954 | Traugott | 346—140 |
| 2,703,746 | 3/1955 | Colt | 346—140 |
| 2,839,653 | 6/1958 | Kane | 219—44.1 |
| 2,879,168 | 3/1959 | Hunter | 106—22 |
| 3,063,050 | 11/1962 | Mills | 346—1 |
| 3,074,800 | 1/1963 | Germann | 106—22 |
| 3,096,742 | 7/1963 | Gill et al. | 120—42.06 |
| 3,146,058 | 8/1964 | Henshaw | 346—140 |

FOREIGN PATENTS 494,457  3/1930  Germany.

LEO SMILOW, *Primary Examiner.*